(12) United States Patent
Longe et al.

(10) Patent No.: US 6,970,599 B2
(45) Date of Patent: Nov. 29, 2005

(54) CHINESE CHARACTER HANDWRITING RECOGNITION SYSTEM

(75) Inventors: Michael R. Longe, Seattle, WA (US); Brian Palmer, Seattle, WA (US)

(73) Assignee: America Online, Inc., Dulles, VA (US)

( * ) Notice: Subject to any disclaimer, the term of this patent is extended or adjusted under 35 U.S.C. 154(b) by 125 days.

(21) Appl. No.: 10/205,950

(22) Filed: Jul. 25, 2002

(65) Prior Publication Data

US 2004/0017946 A1    Jan. 29, 2004

(51) Int. Cl.[7] .............................................. G06K 9/18
(52) U.S. Cl. ..................................................... 382/185
(58) Field of Search ............................... 382/159, 161, 382/165, 182, 185, 186, 187, 188, 189; 434/155, 434/159, 160, 161, 162, 165; 341/28; 715/541

(56) References Cited

U.S. PATENT DOCUMENTS

| | | | | |
|---|---|---|---|---|
| 4,286,329 A | | 8/1981 | Goertzel et al. ............. 345/467 |
| 4,573,196 A | * | 2/1986 | Crane et al. ................. 382/185 |
| 5,187,480 A | * | 2/1993 | Thomas et al. ............... 341/22 |
| 5,224,179 A | | 6/1993 | Denker et al. ............... 382/259 |
| 5,533,147 A | | 7/1996 | Arai et al. ................... 382/179 |
| 5,586,198 A | | 12/1996 | Lakritz ........................ 382/185 |
| 5,734,750 A | * | 3/1998 | Arai et al. ................... 382/202 |
| 5,796,867 A | | 8/1998 | Chen et al. .................. 382/187 |
| 5,923,793 A | | 7/1999 | Ikebata ........................ 382/311 |
| 5,926,566 A | | 7/1999 | Wang et al. ................. 382/185 |
| 5,973,676 A | | 10/1999 | Kawakura ................... 345/173 |
| 6,002,799 A | | 12/1999 | Sklarew ....................... 382/189 |
| 6,028,959 A | | 2/2000 | Wang et al. ................. 382/185 |
| 6,041,137 A | * | 3/2000 | Van Kleeck ................. 382/185 |
| 6,075,469 A | | 6/2000 | Pong ............................ 341/28 |
| 6,130,962 A | | 10/2000 | Sakurai ....................... 382/190 |
| 6,144,764 A | | 11/2000 | Yamakawa et al. ......... 382/187 |
| 6,148,104 A | | 11/2000 | Wang et al. ................. 382/185 |
| 6,172,625 B1 | | 1/2001 | Jin et al. ...................... 341/67 |
| 6,212,297 B1 | | 4/2001 | Sklarew ....................... 382/189 |
| 6,275,611 B1 | | 8/2001 | Parthasaranthy ............ 382/187 |
| 6,278,445 B1 | | 8/2001 | Tanaka et al. ............... 345/178 |

(Continued)

FOREIGN PATENT DOCUMENTS

EP        114 250       2/1992    ............ G06K 9/62

(Continued)

OTHER PUBLICATIONS

*Boxing Code for Stroke-Order Free Handrinted Chinese Character Recognition*; Kwok-Wah Hung, Wing-Nin Leung, Yau-Chuen Lai; Proceeding of IEEE International Conference on Systems, Man, Cybernetics; Oct. 8-11, 2000.

(Continued)

*Primary Examiner*—Andrew W. Johns
*Assistant Examiner*—Shervin Nakhjavan
(74) *Attorney, Agent, or Firm*—Michael A. Glenn; Glenn Patent Group

(57) ABSTRACT

A handwritten Chinese character input method and system is provided to allow users to enter Chinese characters to a data processor by adding less than three strokes and one selection movement such as mouse clicking or stylus or finger tapping. The system is interactive, predictive, and intuitive to use. By adding one or two strokes which are used to start writing a Chinese character, or in some case even no strokes are needed, users can find a desired character from a list of characters. The list is context sensitive. It varies depending on the prior character entered. Compared to other existing systems, this system can save users considerable time and efforts to entering handwritten characters.

17 Claims, 19 Drawing Sheets

U.S. PATENT DOCUMENTS

| | | | |
|---|---|---|---|
| 6,493,464 B1 * | 12/2002 | Hawkins et al. | 382/189 |
| 6,616,703 B1 * | 9/2003 | Nakagawa | 715/530 |
| 2002/0168107 A1 * | 11/2002 | Tang et al. | 382/187 |
| 2003/0144830 A1 * | 7/2003 | Williams | 704/1 |

FOREIGN PATENT DOCUMENTS

| | | | |
|---|---|---|---|
| EP | 762 265 | 3/1997 | G06F 3/033 |
| EP | 961 208 | 12/1999 | G06F 17/21 |
| EP | 1 085 401 | 3/2001 | G06F 3/00 |
| EP | 739 521 | 10/2001 | G06K 9/00 |

OTHER PUBLICATIONS

*On-Line Handwritten Alphanumeric Character Recognition Using Feature Sequences*; Xialin Li and Dit-Yan Yeung; Department of Computer Science; Hong Long University of Science and Technology.

*Quick Stroke information*—www.synaptics.com/products/quickstroke.cfm; and www.synaptics.com/products/quicstroke‾faq.cfm.

*Online Handwriting Character Analysis Using Stroke Correspondence Search*; J. Shin; Journal of Shanghai University, Aizu, University, Fukushima, Japan; Sep. 2001.

*JKanji: Wavelet-Based Interactive Kanji Completion*; R. Stockton, and R. Sukthankar; Proceedings of the 15$^{th}$ International Conference on Pattern Recognition; Sep. 3-7, 2000.

*An On-Line Handwritten Chinese Character Recognition System*; Fang Fan, and Zhen Yong Lin; Proceedings of the SPIE—The International Society for Optical Engineering; Jan. 26-27, 2000.

*Two-layer Assignment Method for Online Chinese Character Recognition*; J.Z. Liu, K. Ma, W.K. Cham, M.M.Y. Chang; IEEE Proceedings-Vision, Image and Signal Processing; Feb. 2000.

*Radical-Based Neighboring Segment Matching Method for On-Line Chinese Character Recognition*; Kuo-Sen Chou, Kuo-Chin Fan, T.-I. Fan; Computer Processing of Oriental Languages; Apr. 1997.

*On-Line Chinese Handwriting Character Recognition: Comparision with Japanese Kanji Recognition and Improvement of Input Efficiency*; H. Nambu, T. Kawamata, F. Maruyama, F. Yoda, K. Ikeda; Transactions of the Information Processing Society of Japan; Aug. 1999.

*Recognizing On-Line Handwritten Chinese Character Via FARG Matching*; Jing Zheng, Xiaoqing Ding, Youshou Wu; Proceedings of the Fourth International Conference on Document Analysis and Recognition; Aug. 18-20, 1997.

*Recognition of Radicals in Handwritten Chinese Characters By Means of Problem Reduction and Knowledge Guidance*; Rei-Heng Cheng, Chi-Wei Lee, Zen Chen; International Journal of Pattern Recognition and Artificial Intelligence; Sep. 1996.

*A Hierarchical Representation for the Reference Database of On-line Chinese Character Recognition*; Ju-Wei Chen, Suh-Yin Lee; Aug. 20-23, 1996.

*Stroke Order and Stroke Number Free On-line Chinese Character Recognition Using Attributed Relational Graph Matching*; Jianzhuanf Liu, W.K. Cham, M.M.Y. Chang; Proceedings of the 13$^{th}$ International Conference on Pattern Recognition; Aug. 25-29, 1996.

*Radical-Based Neighboring Segment Matching Method for On-line Chinese Character Recognition*; Kuo-Sen Chou, Kuo-Chin Fan, T.-I. Fan; Proceedign sof the 13$^{th}$ International Conference on Pattern Recognition; Aug. 25-29, 1996.

*On-Line Recognition of Stroke-Order Free Cursive Chinese Characters With Relaxation Matching*; Ki-Cheol Kim, Seong-Whan Lee; Journal of the Korea Information Science Society; Mar. 1995.

*An On-Line Recognition System for Cursive Chinese Characters with Effective Coarse Classification and Elastic Matching*; Hee-Seon Park, Seong-Whan Lee; Journal of Korea Information Science Society; Sep. 1993.

*Stroke-Order Independent On-Line Recognition of Handwritten Chinese Characters*; Chang-Keng Lin, Bor-Shenn Jeng, Chun-Jen Lee; Proceedings of the SPIE—The International Society for Optical Engineering; Nov. 8-10, 1989.

*Recognition of Handprinted Chinese Characters by Stroke Order Codes*; Pan Bao-Chang, Huan Shang-Lian, V. Mueller; 1988 International Conference on Computer Processing of Chinese and Oriental Languages; Aug. 29-Sep. 1, 1988.

*Stroke Order Free On-Line Handwritten Character Recognition Algorithm*; L. Odaka, T. Wakahara, I. Masuda; Transactions of the Institute of Electronics and Communication Engineers of Japan, Section E; Jun. 1982.

*Rough Classification for Handprinted Chines Characters by Stroke Density*; S. Naito, and K. Komori; Transactions of the Institute of Electronics and Communication Engineers of Japan, Section E; Aug. 1981.

*Cherry Blossom; A System for Japanese Character Recognition*; Sargur N. Srihari, Tao Hong and Zhixin Shi; Center of Excellence for Document Analysis and Recognition.

*Recognition of Hand-printed Chinese Characters Using Decision Trees/Machine Learning C4.5 System*; Adnan Amin, and Sameer Singh; Pattern Analysis and Applications; 1998.

*Optical Chinese Character Recognition Using Probabilistic Neural Networks*; Richard Romero, David Touretzky, and Robert Thibadeau; Imagaing Systems Lab; Carnegie Mellon University.

*Large vocabulary Recognition of On-line Handwritten Cursive Words*; Giovanni Seni, Rohini L. Srihari, and Nasser Nasrabadi.

*Template-based Online Character Recognition*; Scott D. Connell, and Anil K. Jain; Department of Computer Science and Engineering, Michigan State University; Aug. 10, 1999.

*Coarse Writing-Style Clustering Based on Simple Stroke-Related Features*; Louis Vuurpijl, and Lambert Schomaker; Nijmegen Institute for Cogniton and Information, The Netherlands.

Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAC Augmentative and Alternative Communication; vol. 8, Sep. 1992; Copyright 1992 by ISAAC.

* cited by examiner 1  2  3  4  5

CHINESE CHARACTER HANDWRITING RECOGNITION SYSTEM

BACKGROUND OF THE INVENTION

1. Technical Field

This invention relates generally to text input technology. More particularly, the invention relates to a method and system that allows users to input handwritten Chinese characters to a data processor by entering the first few strokes required to write a character, so that users can perform characters input tasks in a fast, predictive way.

2. Description of the Prior Art

Around the globe, over 1.2 billion people speak Chinese. This includes the People's Republic of China, Taiwan, Singapore, and a large community of overseas Chinese in Asia and North America. Chinese character strokes and symbols are so different and so complicated that they can be sorted and grouped in a wide variety of ways. One can analytically sort out as many as 35–40 strokes of 4–10 symbols or more per Chinese character, depending on how they are grouped. Because of this unique structure of Chinese language, computer users cannot input Chinese characters using alphabetic keyboards as easily as inputting Western language.

A number of methods and systems for inputting Chinese characters to screen, such as the Three Corners method, Goo Coding System, 5-Stroke method, Changjie's Input scheme, etc., have been developed. However, none of these input methods provides an easy to use, standardized input/output scheme to speed up the retrieval, typewriting process, by taking full advantage of computer technology.

Several other methods and system for inputting handwritten Chinese characters are also deknown. For example, Apple Computer and the Institute of System Science in Singapore (Apple-ISS) have developed a system which features an application for dictation and a handwriting input method for Chinese. This system incorporates a dictionary assistance service wherein when a first character is recognized, the device displays a list of phrases based on the first character and the user may select the proper phrase without inputting any stroke. This technique effectively increases the input speed.

Another example is Synaptics' QuickStroke system which incorporates a prediction function based on a highly sophisticated neural network engine. This is not a graphics capture application where the users have to write out the entire character before the software can recognize which character is intended. Instead, it can recognize a character after only three to six strokes of the character have been written. It can be used with a standard mouse, Synaptics TouchPad™, or a Synaptics pen input TouchPad.

Another example is Zi Corporation's text input solutions based on an intelligent indexing engine which intuitively predicts and displays desired candidates. The solutions also include powerful personalization and learning capabilities— providing prediction of user-created terms and frequently used vocabulary.

It would be advantageous to provide a handwritten Chinese character input method and system to allow users to enter Chinese characters to a data processor by drawing just the first few strokes and one selection movement such as mouse clicking or stylus or finger tapping.

SUMMARY OF INVENTION

A handwritten Chinese character input method and system is provided to allow users to enter Chinese characters to a data processor by drawing just the first few strokes and one selection movement such as mouse clicking or stylus or finger tapping. The system is interactive, predictive, and intuitive to use. By adding one or two strokes which are used to start writing a Chinese character, users can find a desired character from a list of characters. The list is context sensitive, so in some cases no strokes are needed. It varies depending on the prior character entered. The system puts the handwritten-stroke-to-category mapping on top of the stroke category matching technology, including an optional "Match any stroke category" key or gesture. Compared to other existing systems, this system can save users considerable time and efforts to entering handwritten characters.

In one preferred embodiment, the handwritten Chinese character input system includes: (1) recognition means for recognizing a category of handwriting stroke from a list of stroke categories; (2) collection means for organizing a list of characters that commonly start with one or more recognized categories of handwriting strokes, the list of characters being displayed in a predetermined sequence; and (3) selection means for selecting a desired character from the list of characters.

In a typical embodiment, the strokes are classified into five basic categories, each having one or more sub-categories. The collection means contains predefined stroke order information. It also contain a display means to display a list of most frequently used characters when no strokes are entered, while strokes are being entered, and/or after a character is selected. The list of most frequently used characters is context sensitive. It varies depending upon the last Chinese character entered. The predetermined sequence may be based on any of: (1) number of strokes necessary to write out a character; (2) use frequency of a character; and (3) contextual relation to the last character entered.

The selection means is associated with any of: (1) mouse clicking; (2) stylus tapping; (3) finger tapping; and (4) button/key pressing.

The system also contains "stroke entry means," such as an LCD touchscreen, stylus or finger pad, trackball, data glove, or other touch-sensitive (possibly flexible) surface.

The system may further includes means for displaying a numeric or iconic representation of each stroke that is entered and a full numeric or iconic representation of strokes for a Chinese character that is selected.

According to the preferred embodiment, a method for inputting handwritten Chinese characters includes the following steps:

adding a stroke into the stroke recognition apparatus;
categorizing the added stroke into one of a predetermined number of categories;
finding characters based on frequency of character use;
displaying a list of found characters;
if a desired character is in the list, selecting the desired character from the list;
if a desired character is not visible in the list, adding another stroke;
finding most common characters that appear after a previously selected character based on a present stroke sequence; and
displaying another list of found characters.

The method may further comprise the steps of:
displaying a numeric representation for a stroke that is added; and
displaying full stroke numeric representation for a character that is selected.

As an alternative, the method may comprises the steps of:
  displaying an iconic representation for a stroke that is added; and
  displaying full stroke iconic representation for a character that is selected.

DETAILED DESCRIPTION OF THE INVENTION

Figure 1:
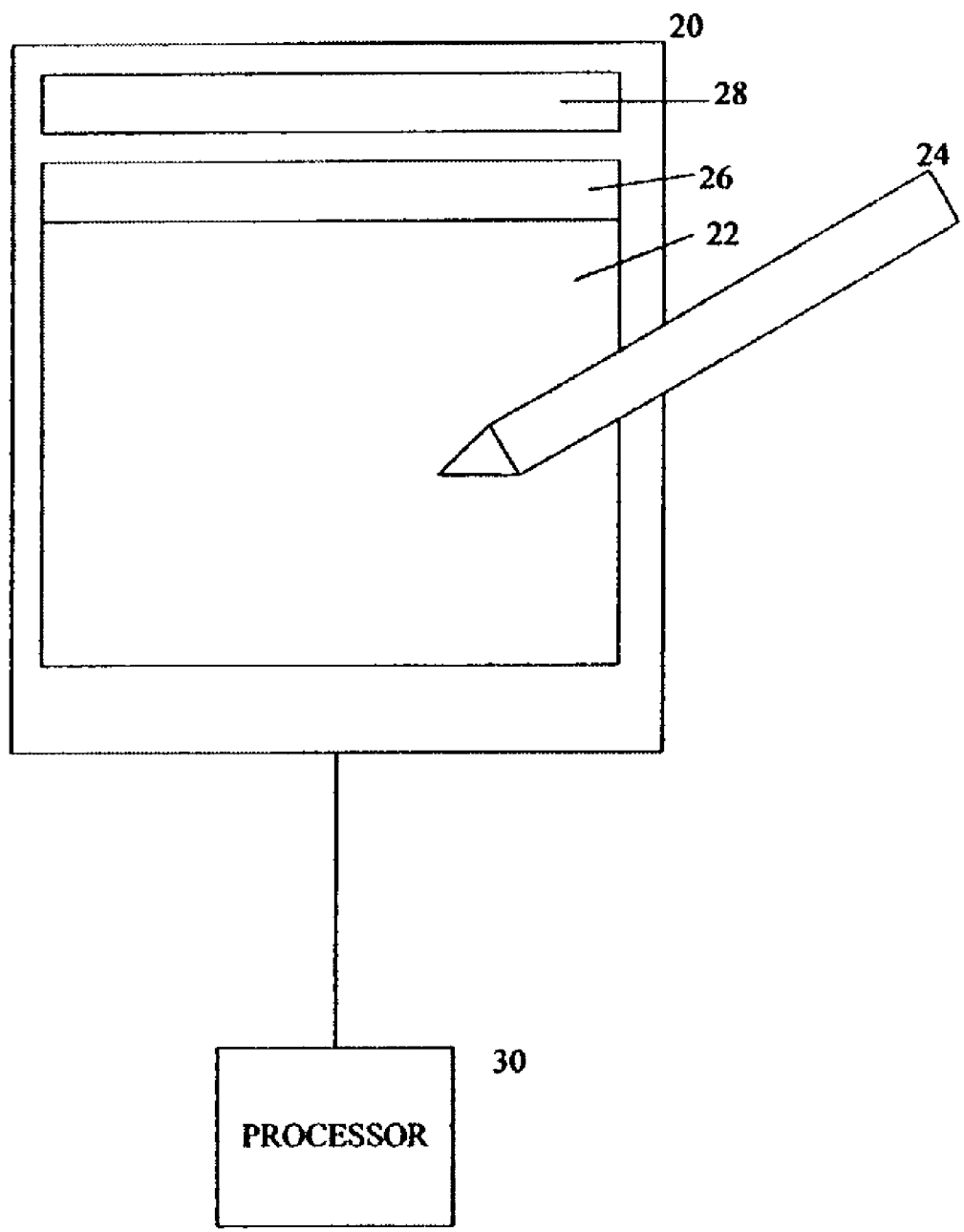
FIG. 1 is a schematic diagram illustrating an apparatus for inputting handwritten Chinese characters according to one preferred embodiment of the invention.

FIG. 1 is a schematic diagram illustrating an apparatus for inputting handwritten Chinese characters according to one preferred embodiment of this invention. The apparatus includes three basic components: a Stroke Recognition Interface 20 for recognizing entered stroke patterns, an Input Device 24 for entering strokes, and a Processor 30 for performing data process tasks.

The Stroke Recognition Interface 20 has three basic areas: a Message Display Area 28, a Selection List Area 26, and a Stroke Input Area 22.

Message Display Area 28 is the place where the selected characters are displayed. It represents an email or SMS message, or whatever application intends to use the generated text.

Selection List Area 26 is the place to display the most common character choices for the strokes currently entered on the stroke input window. This area may also list common characters that follow the last character in the Message Display Area 28, that also begin with the strokes entered in the Stroke Input Area 22.

Stroke Input Area 22 is the heart of the Stroke Recognition Interface 20. The user begins drawing a character onscreen in this area, using an Input Device 24 such as a stylus, a finger, or a mouse, depending on input device and display device used. The display device echos and retains each stroke (an "ink trail") until the character is selected.

Stroke Recognition Interface 20 may further includes a Stroke Number Display Area to display the interfaces interpretation, either numeric or iconic, of the strokes entered by the user. When a character is selected, the full stroke representation, either by numbers or by icons, is displayed here. This area is optional, but could be useful for helping users learn stroke orders and stroke categories.

The system may further include: the capabilities to match Latin letters and punctuation symbols and emoticons, with user-defined stroke sequences; user-defined gestures for predefined stroke categories, and unique gestures representing entire components/sequence/symbols; learning/adapting to user's handwriting style, skew, or cursive; optional training session with known characters; optional prompting user to clarify between ambiguous stroke interpretations, and/or a means to enter explicit strokes,e.g. via stroke category keys), and/or remedy a stroke misinterpretation; optional indication of level of confidence of stroke interpretations, e.g. color-coding each "ink trail" or a smiley-face that frowns when it is uncertain; means to display all strokes that make up a character, e.g. drag & drop from text editor to Stroke [Number] Display Area); as well as ability to delete the last stroke(s) in reverse order (and ink trail(s)) by some means.

Figure 2:
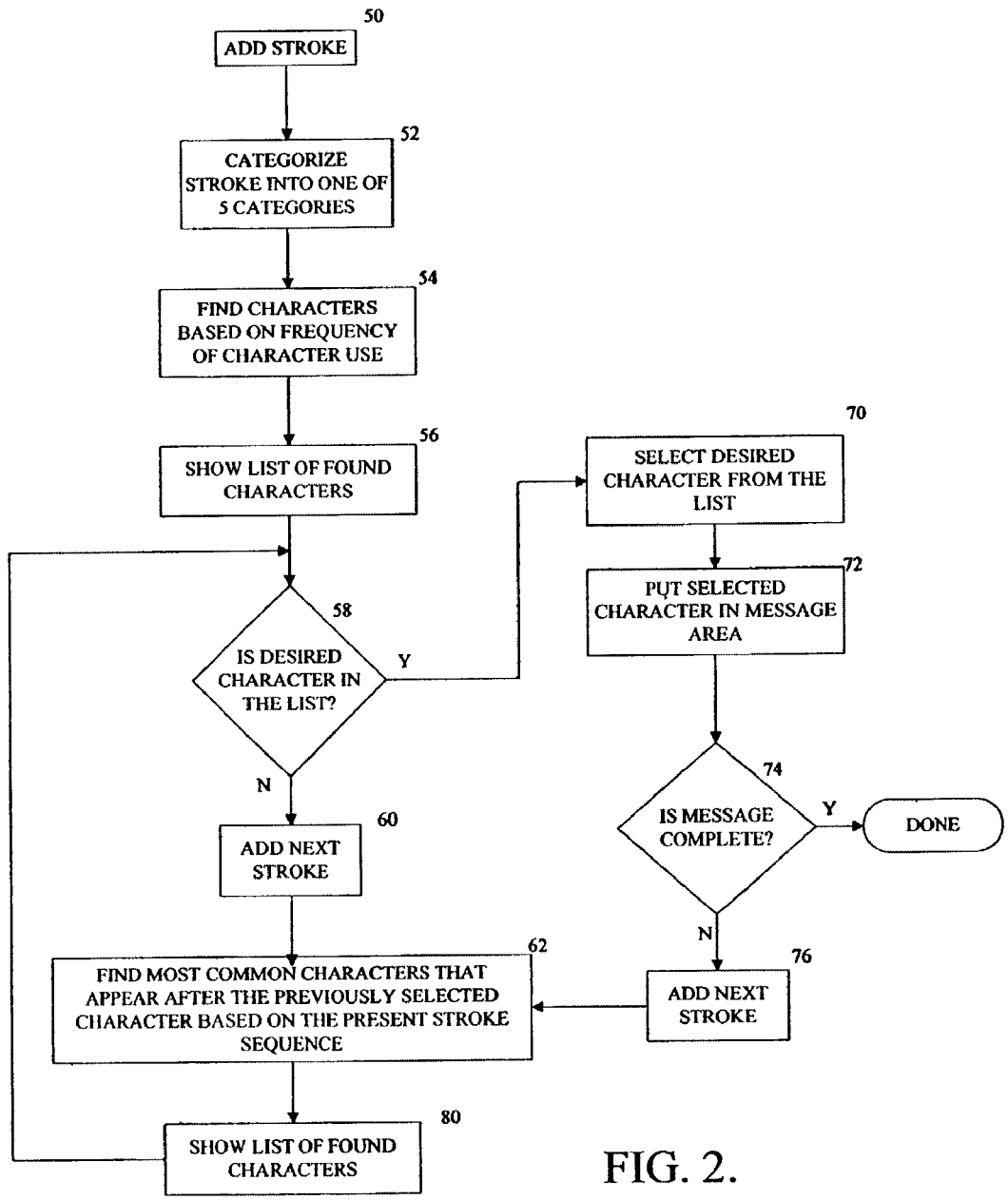
FIG. 2 is a flow diagram illustrating a method for inputting handwritten Chinese characters in a predictive manner according to another preferred embodiment of the invention.

FIG. 2 is a flow diagram illustrating a method for inputting handwritten Chinese characters in a predictive manner according to the preferred embodiment of the invention. The method includes the following steps:

Step 50: Adding a stroke into the Stroke Input Area 22;

Step 52: Categorizing the added stroke into a stroke category.

Step 54: Finding characters based on frequency of character use;

Step 56: Displaying a list of found characters. The list of characters is displayed in a predetermined sequence. The predetermined sequence may be based on (1) number of strokes necessary to write out a Chinese character; (2) use frequency of a Chinese character entered; or (3) contextual relation to the prior character entered;

Step 58: Checking whether the desired character in the list;

Step 60: If the desired character is not in the list, adding next stroke in the Message Display Area 28;

Step 70: If a desired character is in the list, selecting it by clicking a mouse or tapping a stylus or finger, depending on the input and display devices used;

Step 72: Putting the selected character in the Message Display Area 28;

Step 74: Checking whether the message is complete;

Step 76: Adding next stroke if the message is not complete;

Step 62 (continued from Step 60 or Step 76): Finding most common characters that appear after a previously selected character based on a present stroke sequence. This also happens before the first stroke, i.e. before Step 50] and Step 80: Displaying a list of found characters and the process continues on Step 58.

The apparatus may have a function to actively display the interfaces interpretation, either numeric or iconic, of the strokes entered by the user. Therefore, the method described above may further comprise the steps of:

Displaying a numeric representation for a stroke that is added;

Displaying full stroke numeric representation for a character that is selected;

Displaying an iconic representation for a stroke that is added; and

Displaying full stroke iconic representation for a character that is selected.

As an alternative, Step 54 may be replaced by:

Finding characters that commonly start with one or more recognized stroke patterns.

Figure 3:
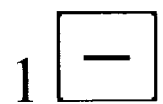
FIG. 3 is a diagram illustrating five basic strokes and their numeric representation.
Figure 3:
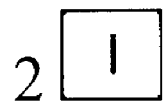
Figure 3:
Figure 3:
Figure 3:
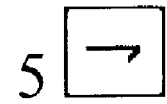

FIG. 3 is a diagram showing five basic strokes and their numeric representation. There is a government standard of five stroke categories for simplified Chinese characters. There are other classification of the stroke categories. The method and system according to this invention apply to any kind of classification.

One of the major advantages of the recognition system according to this invention is the great reduction of ambiguities arising in the subtle distinction between certain subtypes of the stroke categories. To reduce ambiguities, there are further definitions on the subtypes. For example, a horizontal line with a slight hook upwards is stroke 1; a horizontal line with a slight hook down is stroke 5; a horizontal line angled upwards is stroke 1; and a curved line that starts right diagonally then evens out to horizontal or curved up is stroke 4, and etc.

One technique for resolving, or at least limiting, ambiguities, is the use of limited wildcards. These are stroke keys that match with any stroke that fits one type of ambiguity. For example, if the stroke may fit into either stroke category 4 or stroke category 5, the limited wildcard would match both 4 and 5.

Often the difference between a stroke of one type and a similar stroke of another type are too subtle for a computer to differentiate. This gets even more confusing when the user is sloppy and curves his straight strokes, or straightens his curved strokes, or gets the angle slightly off.

To account for all of the variation of an individual user, the system may learn the specific idiosyncrasies of its one user, and adapt to fit that person's handwriting style.

The specifics of the exaggeration needed may be determined as appropriate. Key to this aspect of the invention is that the user has to make diagonal strokes very diagonal, straight strokes very straight, curved strokes very curved, and angled strokes very angled.

The result on paper is a character that would look somewhat artificial and a caricature of its intended character. However, this greatly simplifies the disambiguation process for finding the strokes, which then helps the disambiguation of characters.

In the following paragraphs in conjunction with a series of pictorial diagrams, the operation process is described.

Figure 4A:
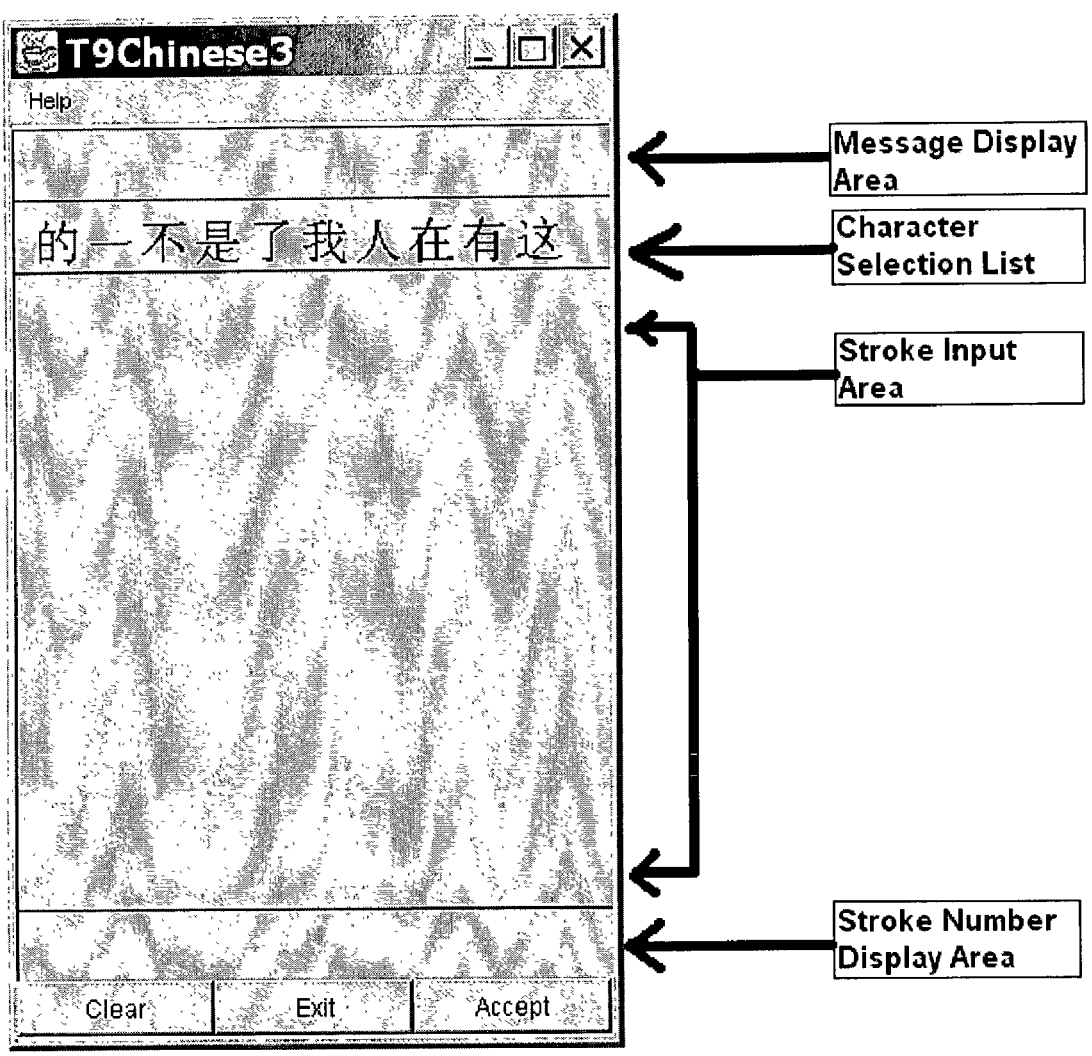
FIG. 4A is a pictorial diagram illustrating an overview of the Stroke Recognition Interface prior to any input.

FIG. 4A illustrates an overview of the Stroke Recognition Interface before any stroke is added. Note that the Character Selection List shows the first ten most frequently used characters. If a user's first desired character is in the list, he just selects the character by clicking the mouse or by tapping a stylus or his finger, without need to add a stroke. If the desired character is not in the list, the user adds a stroke using mouse, stylus, or finger.

Figure 4B:
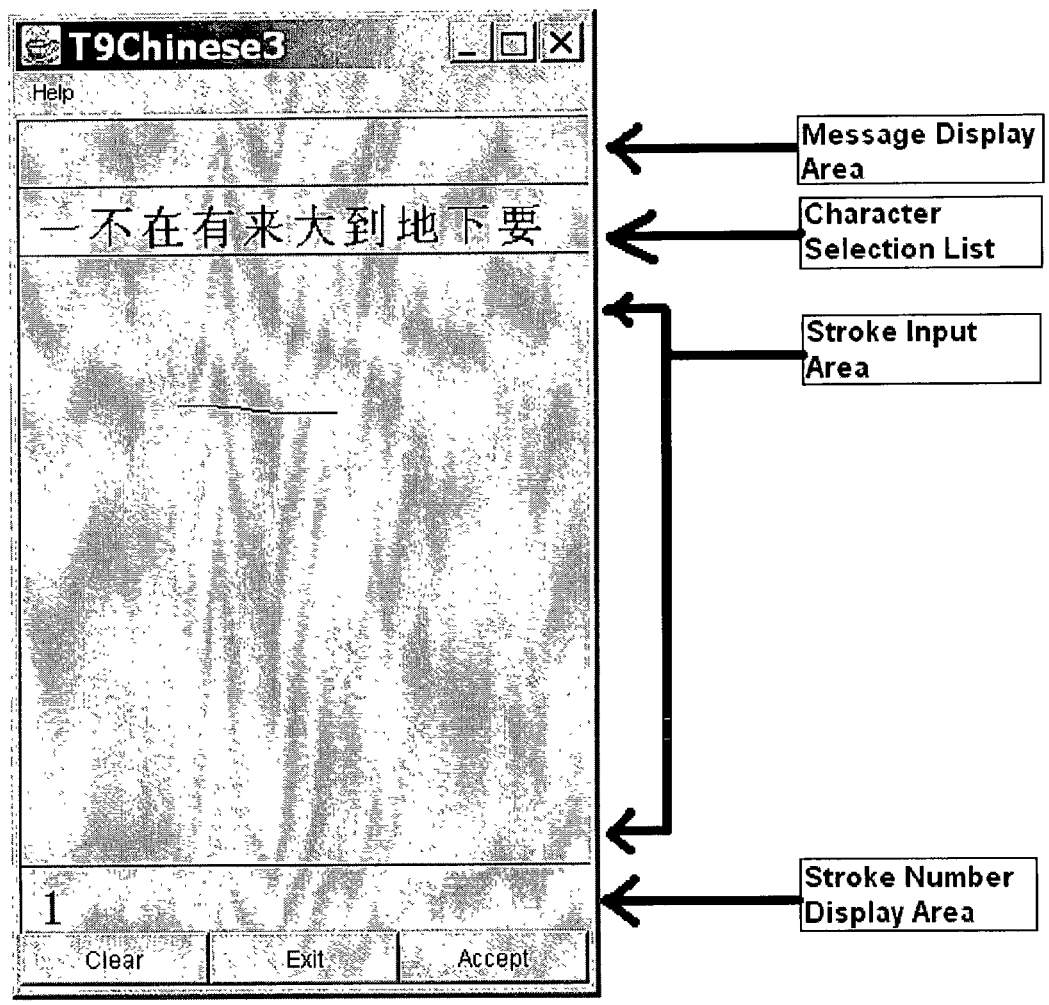
FIG. 4B is a pictorial diagram illustrating the Stroke Recognition Interface when a first single horizontal stroke is added.

FIG. 4B illustrates the Stroke Recognition Interface when a first single horizontal stroke is added. The stroke category is determined to be "1", and is listed in the Stroke Number Area. The Selection List is re-ordered to predict the most likely character to be chosen based on the first stroke.

Figure 4C:
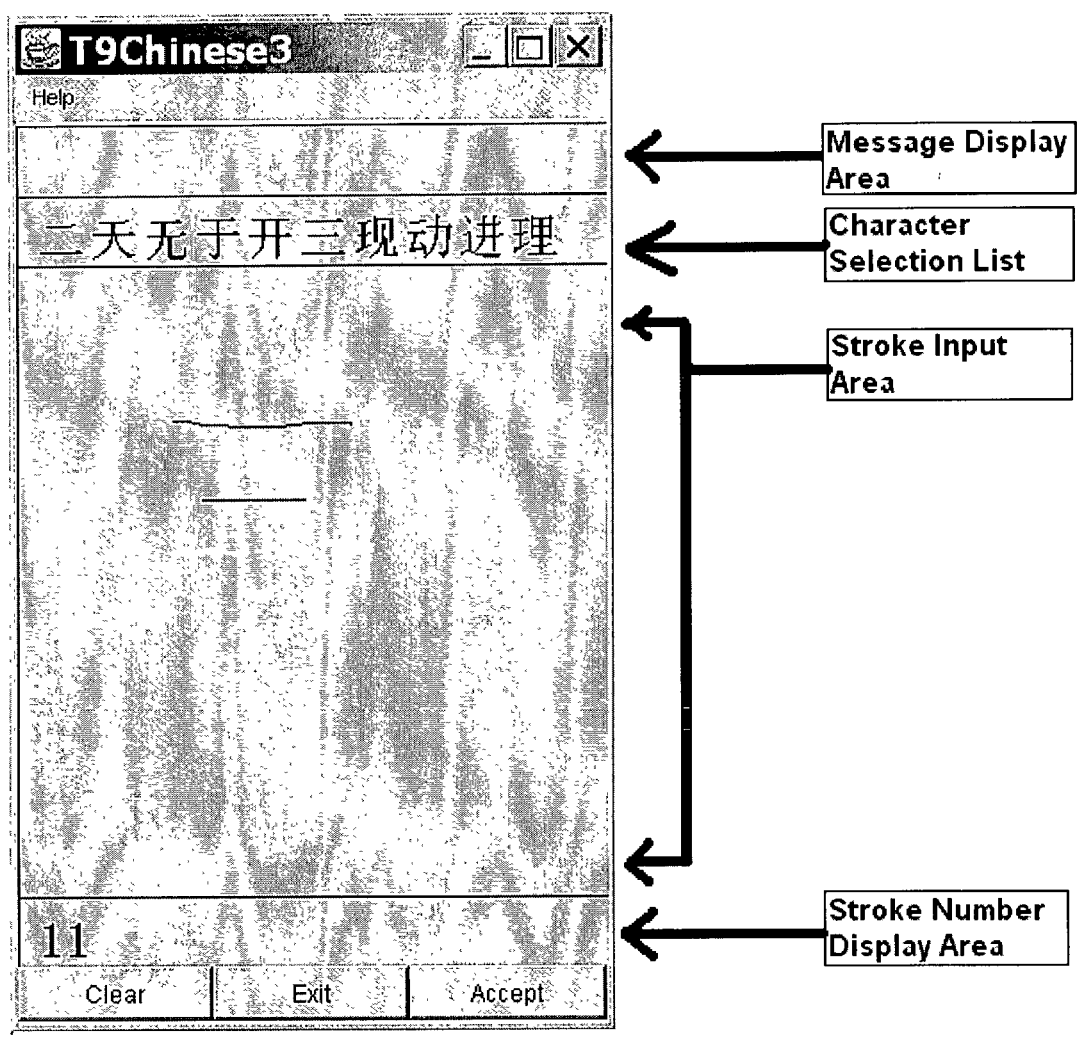
FIG. 4C is a pictorial diagram illustrating the Stroke Recognition Interface when a second horizontal stroke is added.

FIG. 4C illustrates the Stroke Recognition Interface when a second horizontal stroke is added. After a second horizontal line is entered, the selection list is re-ordered again, showing only the most likely characters that start with two horizontal lines (stroke category 1). Note that the position and relative lengths of the strokes do not affect the selection list, only the stroke categories.

Figure 4D:
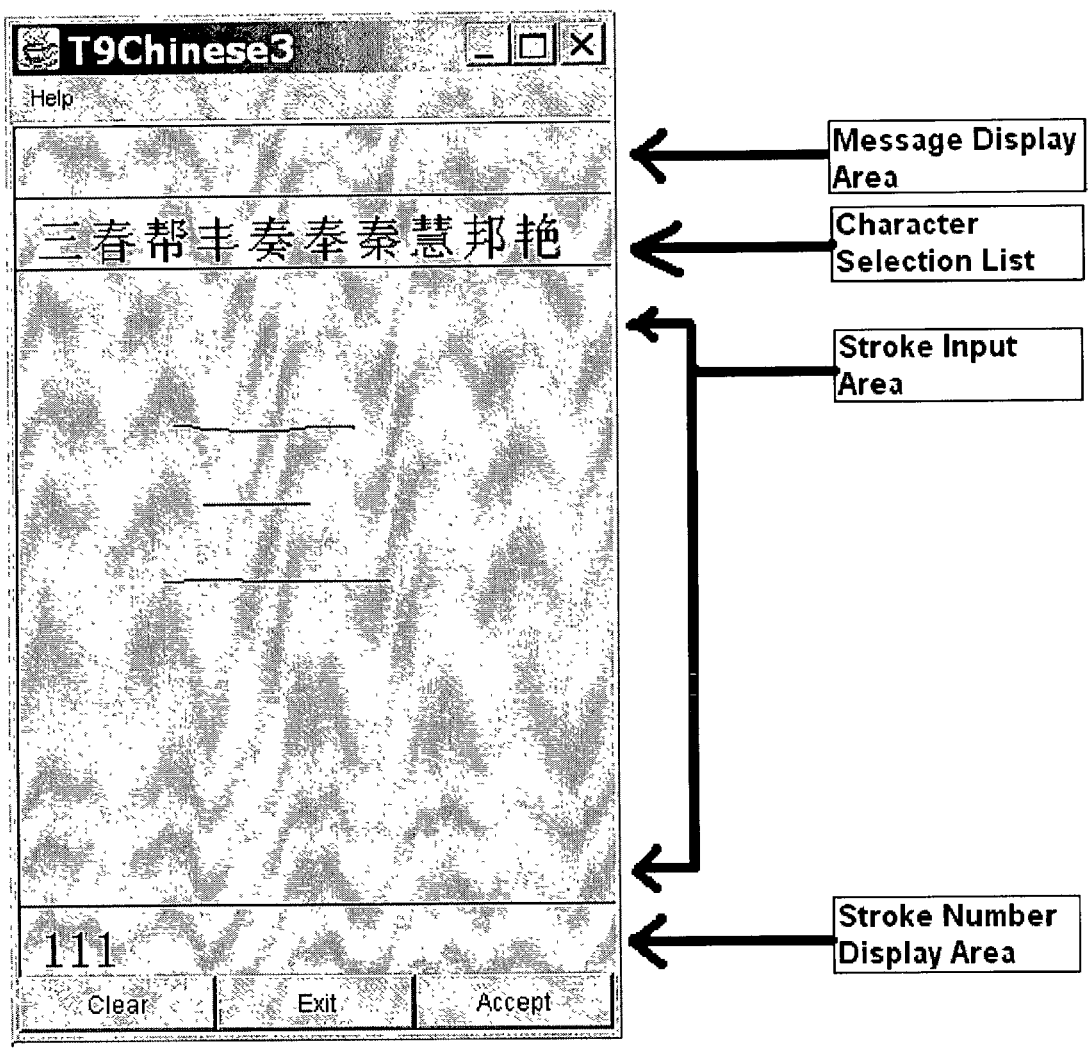
FIG. 4D is a pictorial diagram illustrating the Stroke Recognition Interface when a third horizontal stroke is added.

FIG. 4D illustrates the Stroke Recognition Interface when a third horizontal stroke is added. After a third horizontal line is entered, the selection list is re-ordered again, showing only the most likely characters that start with three horizontal lines (stroke category 1).

Figure 4E:
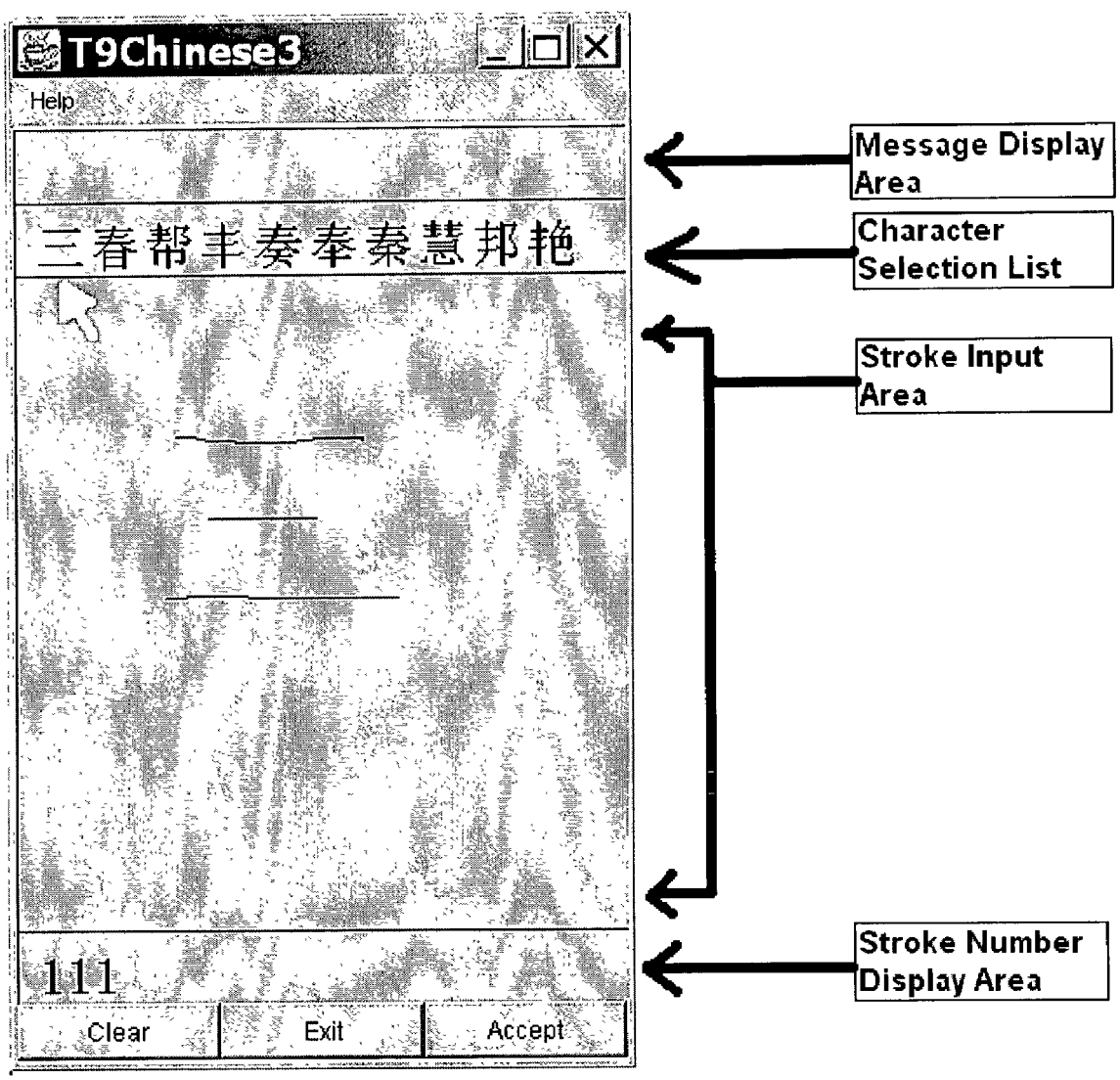
FIG. 4E is a pictorial diagram illustrating the Stroke Recognition Interface when a desired character appears to be the first character in the Selection List.

FIG. 4E illustrates the Stroke Recognition Interface when a desired character appears to be the first character in the Selection List. Note that the character drawn so far is identical to the first character listed in the selection list. If this were the character desired, simply click that character from the list.

Figure 4F:
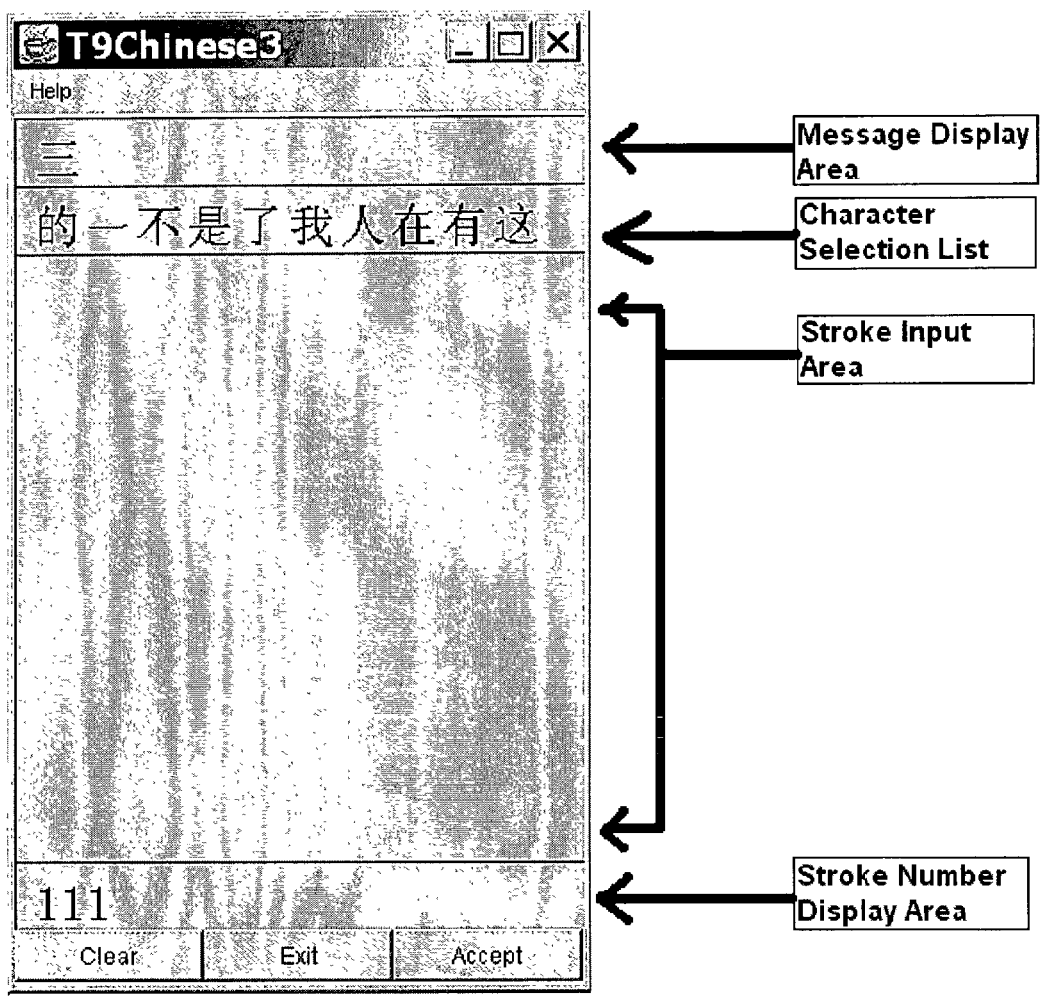
FIG. 4F is a pictorial diagram illustrating the Stroke Recognition Interface when the first character in the selection list is selected.

FIG. 4F illustrates the Stroke Recognition Interface when the first character in the selection list is selected. If the user chooses the first character, it is added to the message; at the same time, the stroke numbers are displayed at the bottom, and the input area is cleared, ready for the next character. Note that to select a character, the user has to take one additional mouse click (or stylus or finger press/tapping) than there are strokes. Novice users may find this annoying until they get used to the system, and lean to take advantage of its predictive features.

Figure 4G:
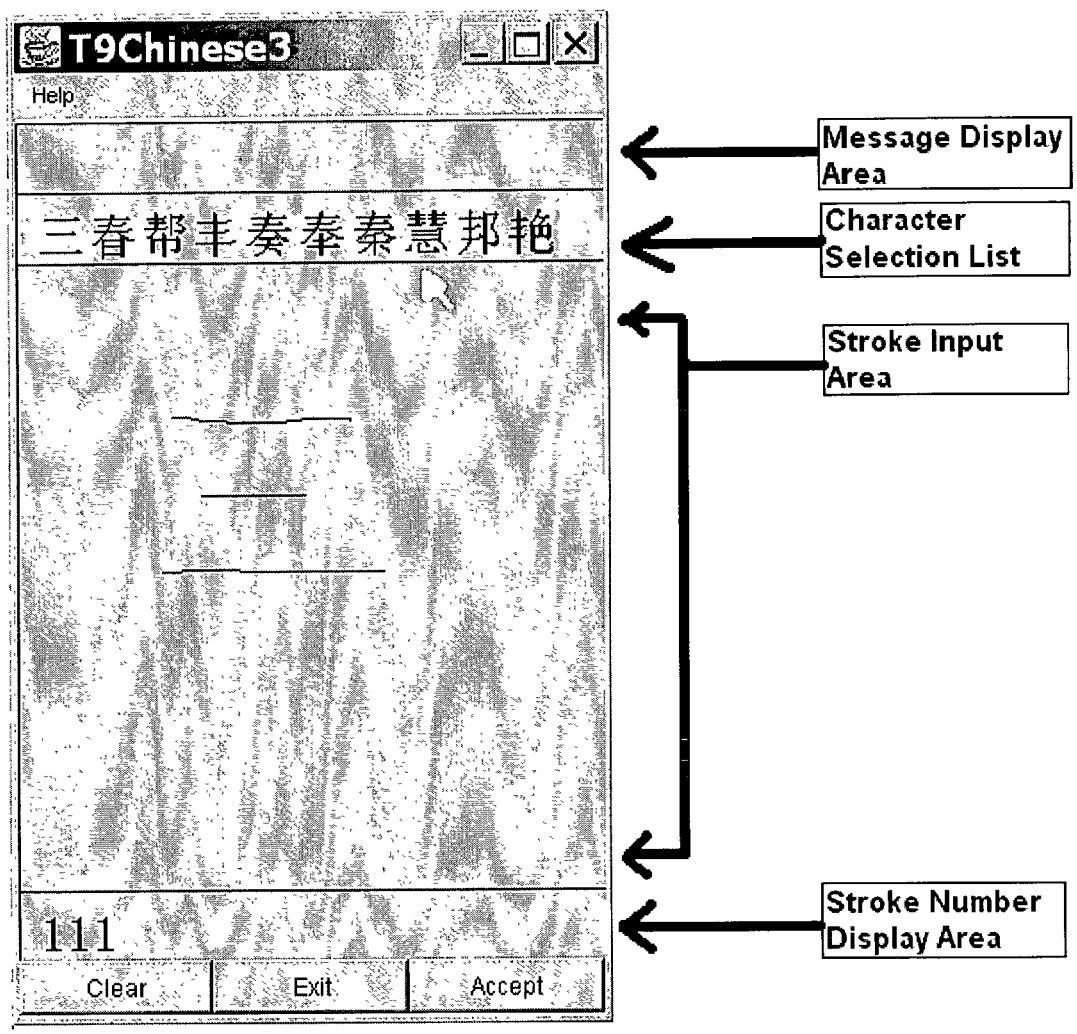
FIG. 4G is a pictorial diagram illustrating the Stroke Recognition Interface when a desired character is not the first character in the selection list.

FIG. 4G illustrates the Stroke Recognition Interface when a desired character is not the first character in the selection list. The strength of this system is its predictive abilities. If the user desired the very complex, but somewhat common, character pointed to in the above illustration, he needs not complete the stroke for that character. As soon as it is displayed in the selection list, it can be selected by clicking a mouse (or stylus or finger tapping) on the character.

Figure 4H:
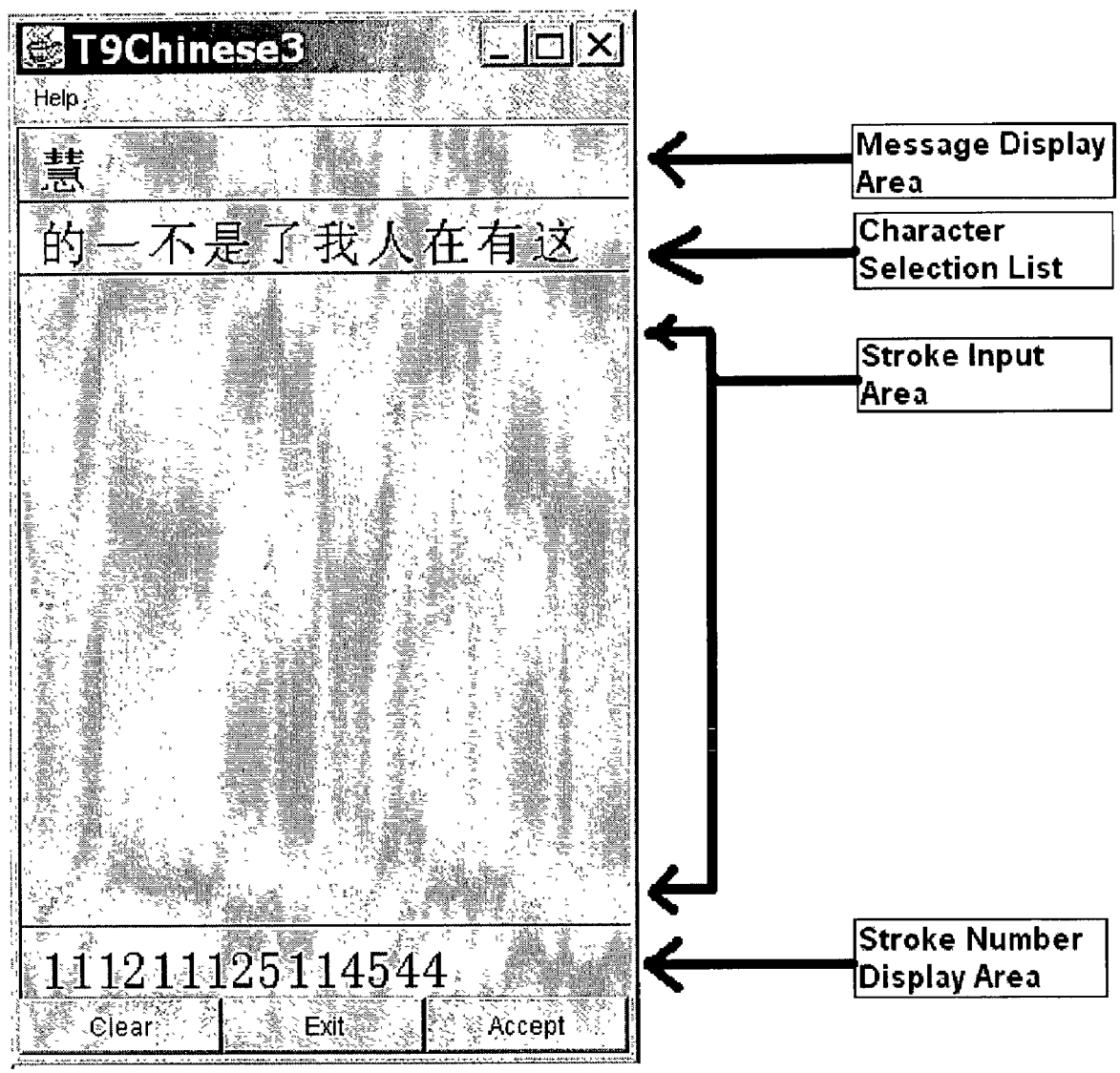
FIG. 4H is a pictorial diagram illustrating the Stroke Recognition Interface when the desired character rather than the first character in the selection list is selected.

FIG. 4H illustrates the Stroke Recognition Interface when the desired character rather than the first character in the selection list is selected. Once the complex character is selected, we see that it is a 15-stroke character, added to the message with only three strokes and one additional click. The user gets a 15-stroke character using four movements. The saving of movement and hence time is about four to one. Additionally, the entire stroke order is displayed now, so if the user was used to an alternate stroke order for the character, he can learn the Government Standard stroke order used by this system.

Figure 4I:
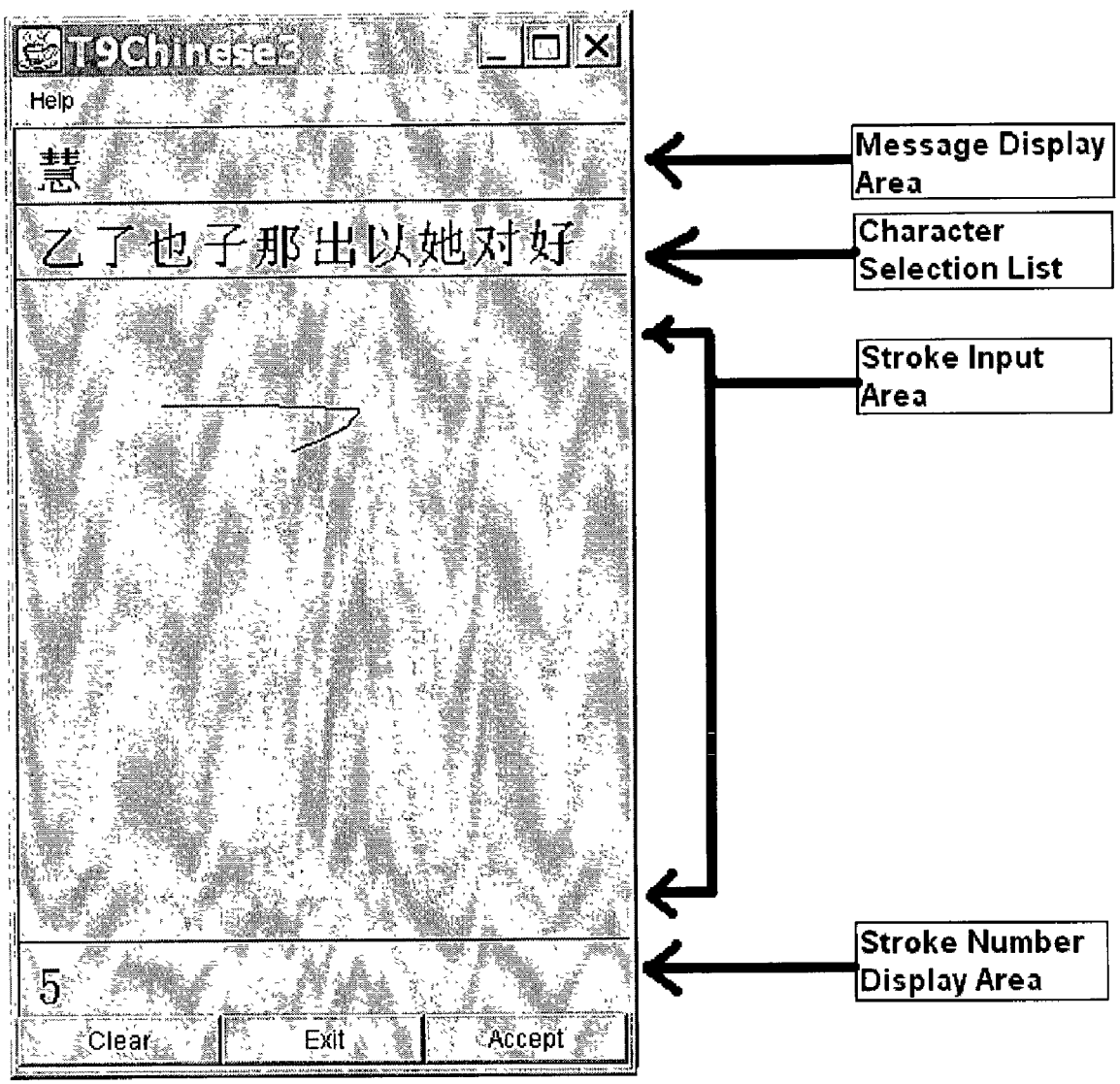
FIG. 4I is a pictorial diagram illustrating the Stroke Recognition Interface when the first desired character is selected and a stroke is added for another character.

FIG. 4I illustrates the Stroke Recognition Interface when the first desired character is selected and a stroke is added for another character. Once the character is entered, the program is ready to accept the strokes for another character. Here the initial stroke is a different category, to enter in a very different character. Notice that the selection list is very different than it was with the first stroke of the previous character.

Figure 4J:
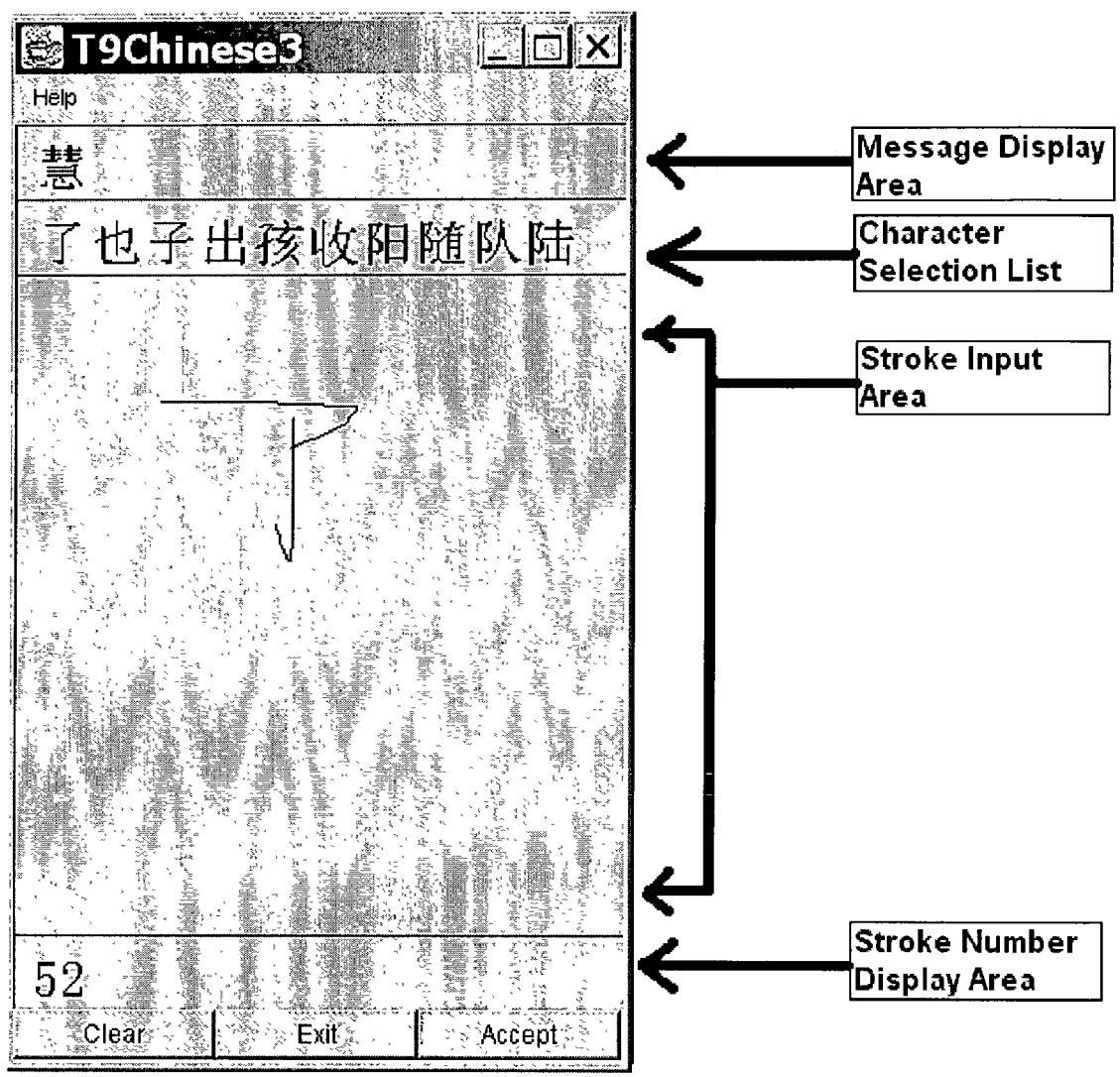
FIG. 4J is a pictorial diagram illustrating the Stroke Recognition Interface when two strokes are added.

FIG. 4J illustrates the Stroke Recognition Interface when two strokes are added. Note that the strokes entered already form a character that matches the most likely choice in the selection list. The character that we are aiming for in this example is already displayed (see the fifth character from the left) after the second stroke is added. But we want to continue to demonstrate the disambiguation feature of the system.

Figure 4K:
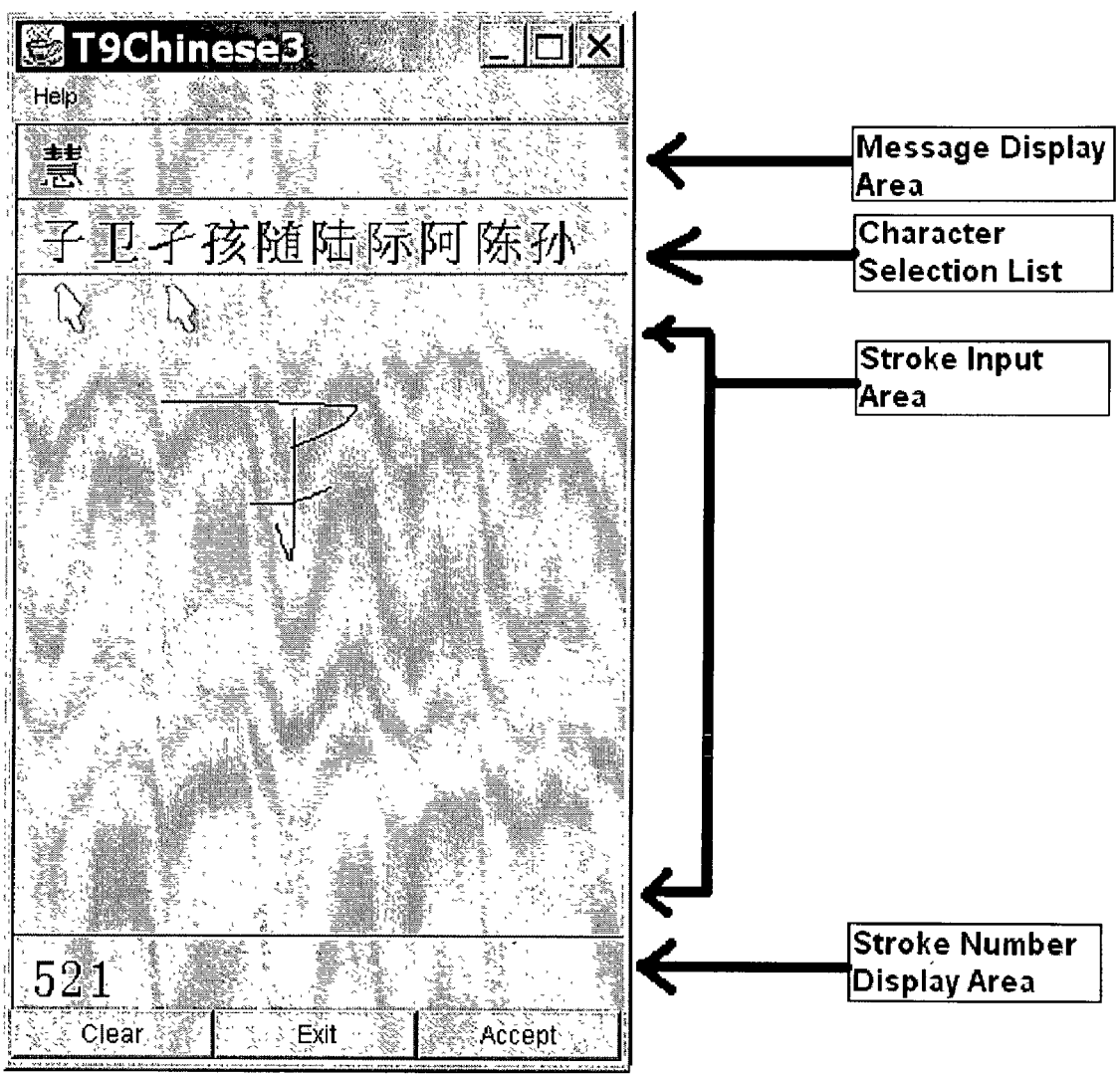
FIG. 4K is a pictorial diagram illustrating the Stroke Recognition Interface when third stroke is added.

FIG. 4K illustrates the Stroke Recognition Interface when the third stroke is added. After a third stroke is entered, the selection list contains two characters that are only slightly different from each other. In fact, these two characters have exactly the same stroke order, and choosing from the selection list is the only way to disambiguate the two characters. Note that the second character being pointed to one is less commonly used than not only the first, but also of a slightly more complex character.

Figure 4L:
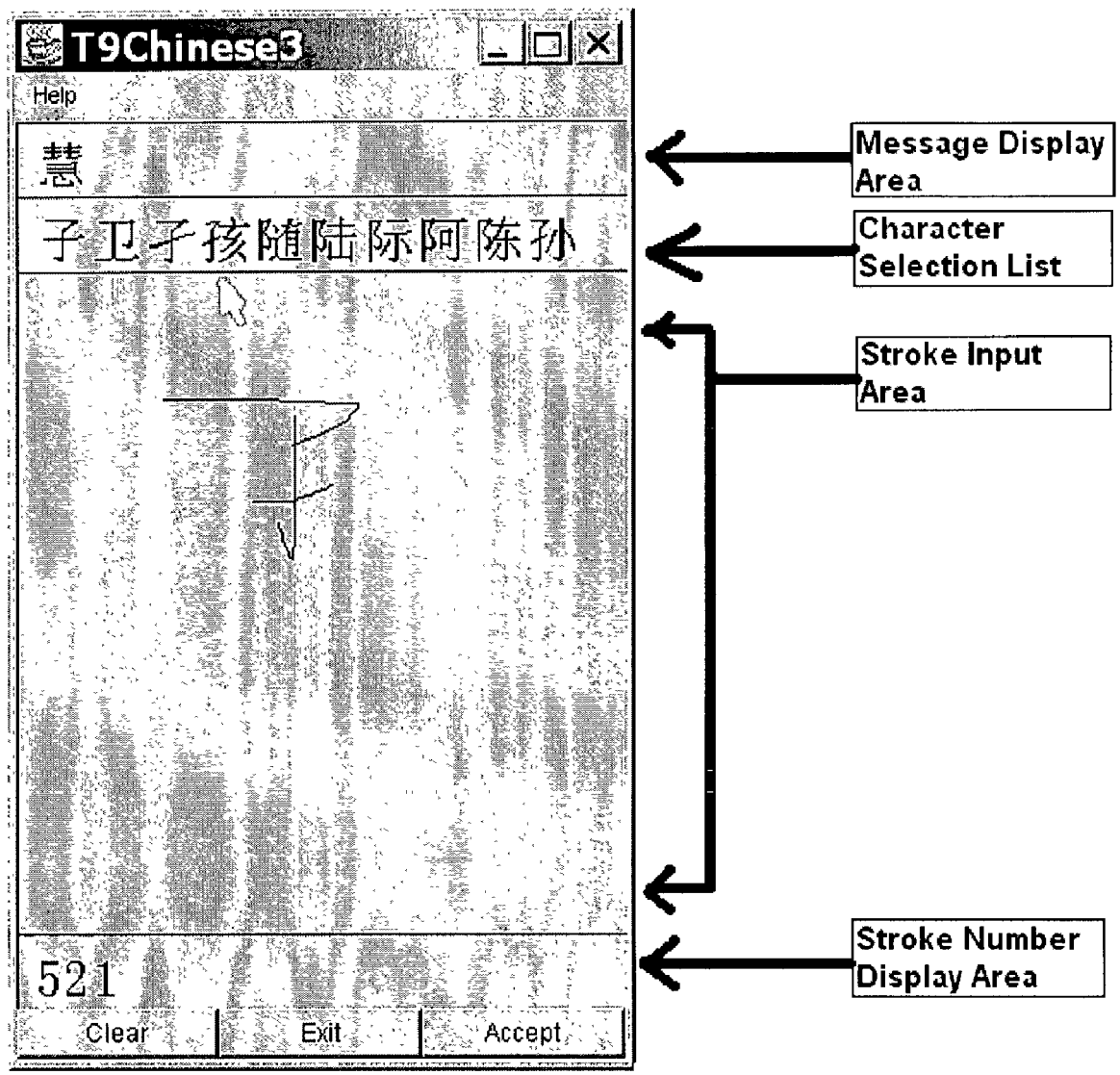
FIG. 4L is a pictorial diagram illustrating the Stroke Recognition Interface where the desired character is indicated.

FIG. 4L illustrates the Stroke Recognition Interface where the desired character is indicated. Note that the desired character was first visible after the second stroke was entered, and is still a likely choice in the selection list (see the fourth character from the left). If a desired character is removed from the selection list for some reason, it is indication that the stroke order entered by the user does not match the Government Standard stroke order used in the system.

Figure 4M:
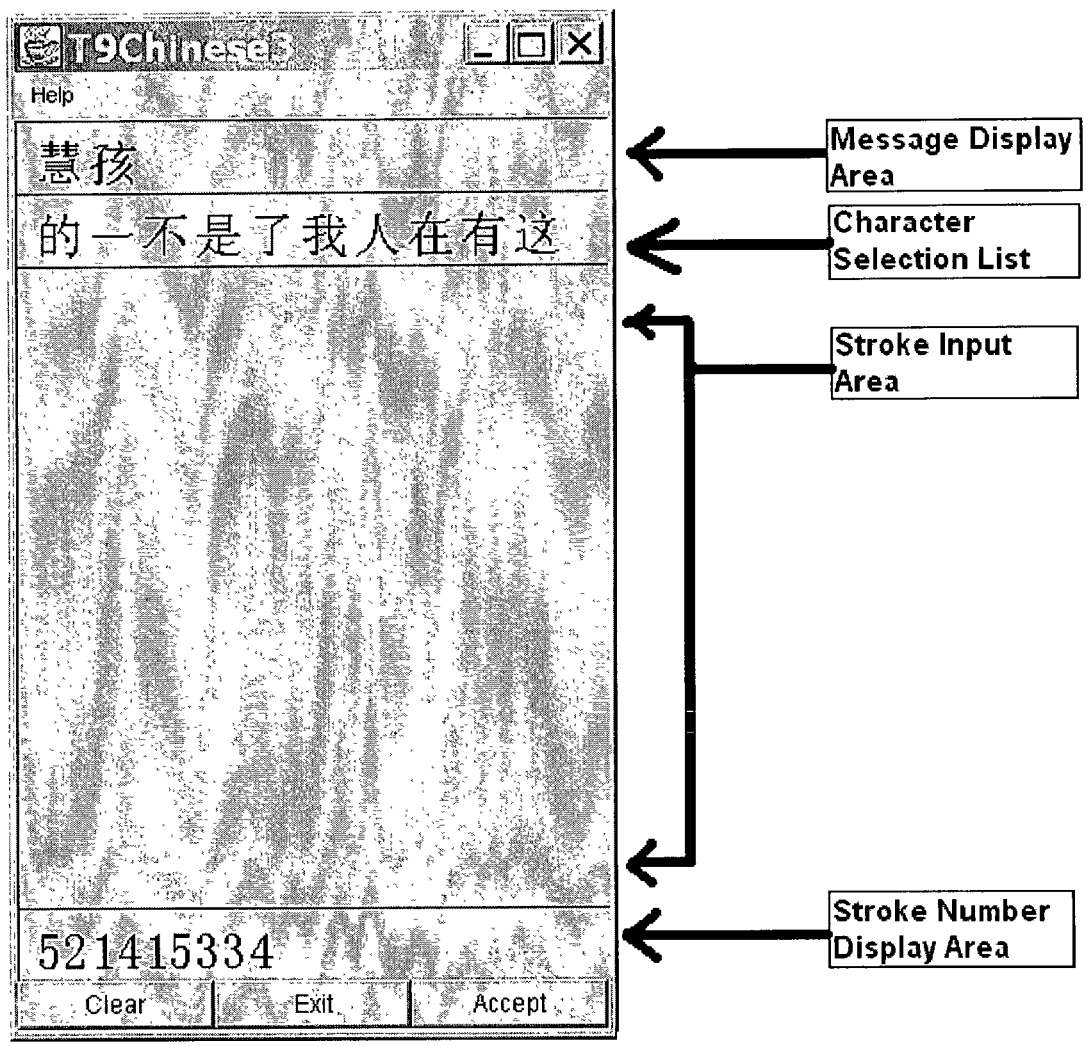
FIG. 4M is a pictorial diagram illustrating the Stroke Recognition Interface when the second desired character is selected.

FIG. 4M illustrates the Stroke Recognition Interface when the second desired character is selected. The character is selected, and added to the message. It is a 9-stroke character. We selected it at three strokes, but could have selected it at two strokes.

Figure 4N:
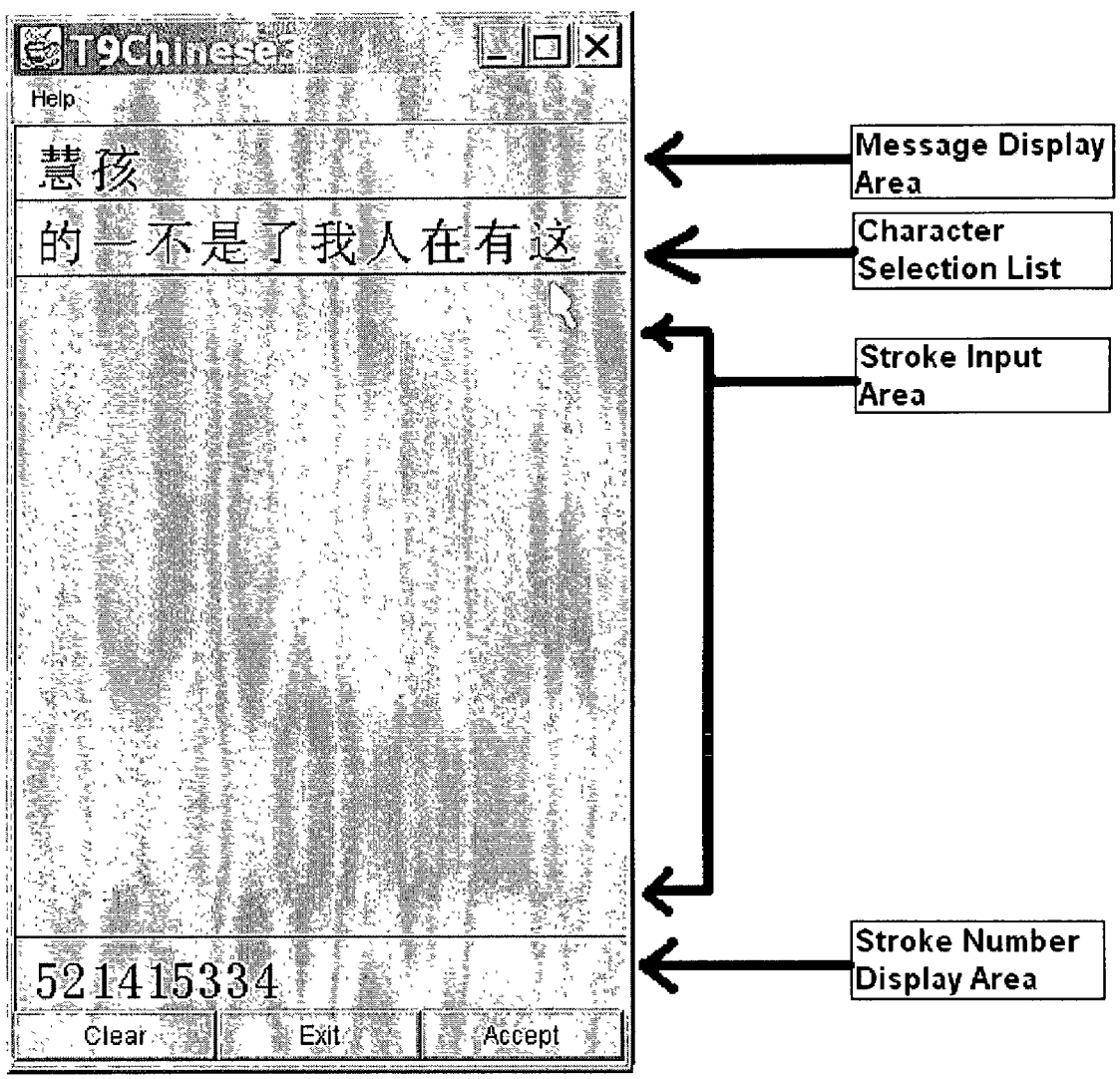
FIG. 4N is a pictorial diagram illustrating the Stroke Recognition Interface where a third desired character appears in the most frequently used characters.

FIG. 4N illustrates the Stroke Recognition Interface where a third desired character appears in the most frequently used characters. For very common characters, there is no need to enter any strokes. The ten most frequently used characters are displayed even when no strokes are entered. If the user wants to enter one of these common characters, simply selecting it will add it to the message. Note that the selection list of the most frequently used characters is context sensitive. The system displays the ten most frequent characters to follow the last character entered.

Figure 4O:
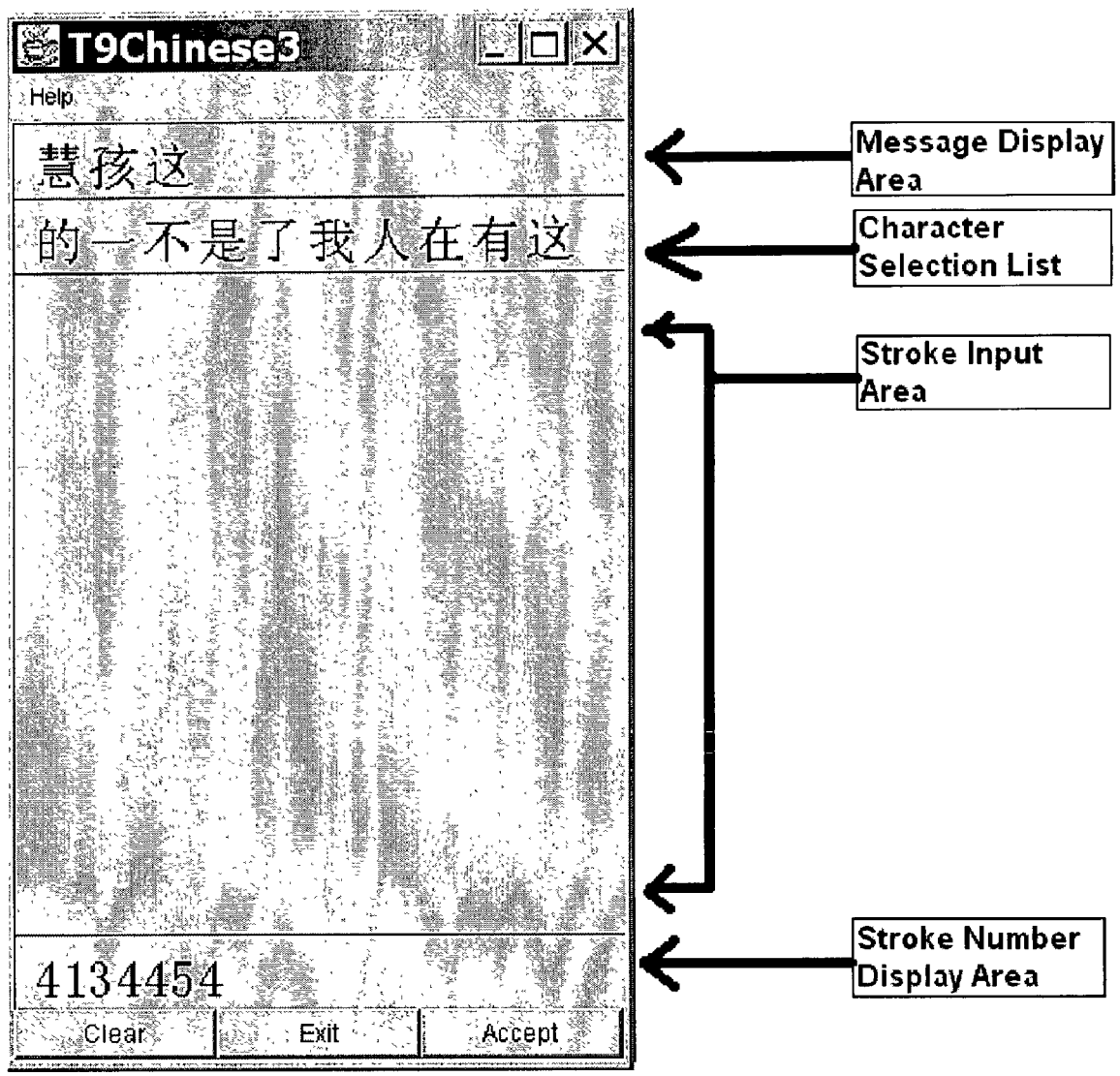
FIG. 4O is a pictorial diagram illustrating the Stroke Recognition Interface when a third desired character is selected without adding any stroke.

FIG. 4O illustrates the Stroke Recognition Interface when a third desired character is selected without adding any stroke. This is a saving of seven to one for the third character.

Figure 5:
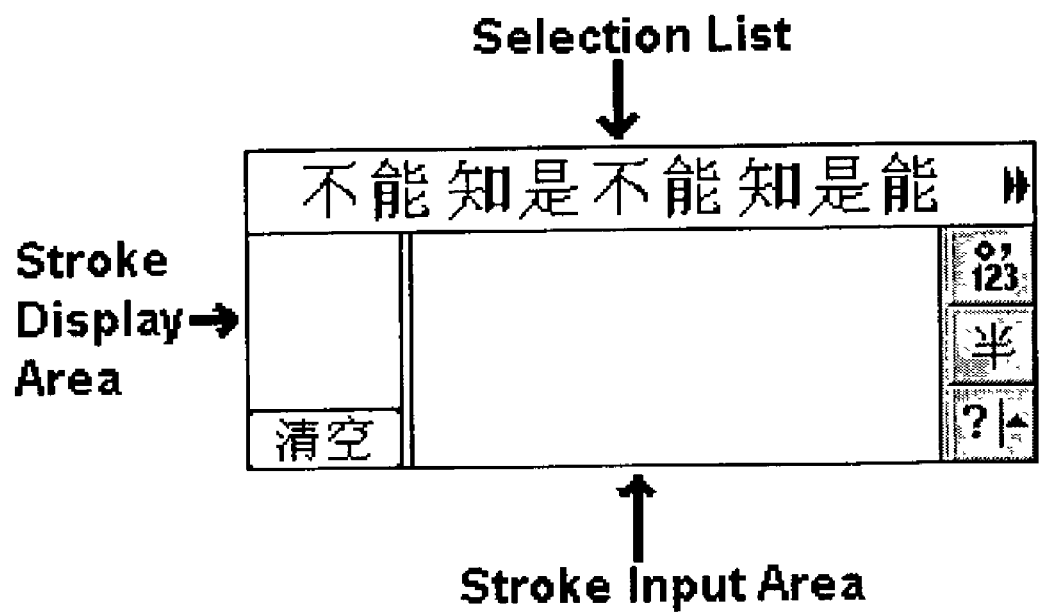
FIG. 5 is a schematic diagram illustrating the input interface for touchscreen PDA according to the most preferred embodiment of the invention.

FIG. 5 illustrates a recommended layout of the input interface according to the most preferred embodiment, where the message area is omitted and the text goes directly into the active application, so there is no need for a message area.

In a typical embodiment, the stroke entry means is a handwriting input area displayed on a touchscreen on a PDA. Each entered stroke is recognized as one of a set of stroke categories. The graphical keys, each assigned to a stroke category, are optionally available to display and enter strokes, as an alternative input means. One of the graphical keys represents "match any stroke category".

The method described above may be carried out by a computer usable medium containing instructions in computer readable form. In other words, the method may be incorporated in a computer program, a logic device, mobile device, or firmware and/or may be downloaded from a network, e.g. a Web site over the Internet. It may be applied in all sorts of text entry.

Although the invention is described herein with reference to some preferred embodiments, one skilled in the art will readily appreciate that other applications may be substituted for those set forth herein without departing from the spirit and scope of the present invention.

Accordingly, the invention should only be limited by the claims included below.

What is claimed is:

1. A Chinese character handwriting input system, comprising:
   recognition means for recognizing a category of handwriting stroke from a predefined number of stroke categories;
   collection means for organizing a list of characters that commonly start with one or more recognized categories of handwriting stroke, said list of characters being displayed in a predefined sequence, wherein said predefined sequence is based on any of;
   number of strokes necessary to write out a character;
   use frequency of a character; and
   contextual relation to the last character entered;
   selection means to selecting a desired character from said list of characters; and
   means for displaying a numeric representation of each stroke that is entered and a full numeric representation of strokes for a Chinese character that is selected.

2. A Chinese character handwriting input system, comprising:
   recognition means for recognizing a category of handwriting stroke from a predefined number of stroke categories;
   collection means for organizing a list of characters that commonly start with one or more recognized categories of handwriting stroke, said list of characters being displayed in a predefined sequence, wherein said predefined sequence is based on any of:
   number of strokes necessary to write out a character;
   use frequency of a character; and
   contextual relation to the last character entered; and
   selection means for selecting a desired character from said list of characters;
   wherein said predefined number of stroke categories comprises five basic categories, each having one or more sub-categories.

3. The Chinese character handwriting input system of claim 2 or 1, wherein said collection means displays a list of most frequently used characters when no strokes are entered or after a character is selected.

4. The Chinese character handwriting input system of claim 3, wherein said list of most frequently used characters is context sensitive, depending upon a last Chinese character entered.

5. The Chinese character handwriting input system of claim 2 or 1, wherein said selection means is associated with any of:
   mouse clicking;
   stylus tapping;
   finger tapping;
   key pressing; and
   button pressing.

6. A method for inputting handwritten Chinese characters, comprising the steps of:
- adding a stroke into a pattern recognition system;
- categorizing said added stroke into one of a predefined number of stroke categories;
- finding characters based on frequency of character use;
- displaying a list of found characters;
- if a desired character is in said list, selecting said desired character from said list;
- if a desired character is not visible in said list, adding another stroke;
- finding most common characters that appear after a previously selected character based on a present stroke sequence; and
- displaying another list of found characters.

7. The method for inputting handwritten Chinese characters of claim 6, further comprising the steps of:
- displaying a numeric representation for a stroke that is added; and
- displaying full stroke numeric representation for a character that is selected.

8. The method for inputting Chinese handwriting characters of claim 6, further comprising the steps of:
- displaying an iconic representation for a stroke that is added; and
- displaying full stroke iconic representation for a character that is selected.

9. A computer readable storage medium for storing a program executed in a data recognition apparatus, the program comprising the steps of:
- adding a stroke into a pattern recognition system;
- categorizing said added stroke into one of a predefined number of stroke categories;
- finding characters based on frequency of character use;
- displaying a list of found characters;
- if a desired character is in said list, selecting said desired character from said list;
- if a desired character is not visible in said list, adding another stroke;
- finding most common characters that appear after a previously selected character based on a present stroke sequence; and
- displaying another list of found characters.

10. The storage medium for storing a program executed in a data recognition apparatus according to claim 9, wherein the program further comprises the steps of:
- displaying a stroke number when a stroke is added; and
- displaying full stroke numeric representation when a character is selected.

11. The storage medium for storing a program executed in a data recognition apparatus according to claim 9, wherein the program further comprises the steps of:
- displaying a stroke icon when a stroke is added; and
- displaying full stroke iconic representation when a character is selected.

12. A method for inputting handwritten Chinese characters, comprising the steps of:
- adding a stroke into a pattern recognition system;
- categorizing said added stroke into one of predefined number of stroke categories;
- finding characters that commonly start with one or more recognized patterns of handwriting stroke;
- displaying a list of found characters, said list of characters being displayed in a predefined sequence;
- if a desired character is in said list, selecting said desired character from said list;
- if a desired character is not visible in said list, adding another stroke;
- finding most common characters that appear after a previously selected character based on a present stroke sequence;
- displaying another list of found characters;
- displaying a numeric representation for a stroke that is added; and
- displaying full stroke numeric representation for a character that is selected.

13. The method for inputting handwritten Chinese characters of claim 12, further comprising the steps of:
- displaying an iconic representation for a stroke that is added; and
- displaying full stroke iconic representation for a character that is selected.

14. The method for inputting handwritten Chinese characters of claim 12, wherein said predetermined sequence is based on any of:
- number of strokes necessary to write out a Chinese character;
- use frequency of a Chinese character; and
- contextual relation to the last Chinese character entered.

15. A computer readable storage medium for storing a program executed in a data recognition apparatus, the program comprising the steps of:
- adding a stroke into a pattern recognition system;
- categorizing said added stroke into one of a predefined number of stroke categories;
- finding characters that commonly start with one or more recognized patterns of handwriting stroke;
- displaying a list of found characters, said list of Chinese characters being displayed in a predefined sequence;
- if desired character is in said list, selecting said desired character from said list;
- if a desired character is not visible in said list, adding another stroke;
- most common characters that appear after a previously selected character based on a present stroke sequence;
- displaying another list of found characters;
- displaying a numeric representation for a stroke that is added; and
- displaying full stroke numeric representation for a character that is selected.

16. The storage medium for storing a program executed in a data recognition apparatus according to claim 15, wherein the program further comprises the steps of:
- displaying an iconic representation for a stroke that is added; and
- displaying full iconic representation for a character that is selected.

17. The storage medium for storing a program executed in a data recognition apparatus according to claim 15, wherein said predetermined sequence is based on any of:
- number of strokes necessary to write out a character;
- use frequency of a character; and
- contextual relation to the last character entered.

* * * * *